FERROELECTRIC STORAGE MEANS

INVENTORS
ENNIO FATUZZO & HANS ROETSCHI
BY Samuel Cohen
Attorney

Oct. 25, 1966 E. FATUZZO ET AL 3,281,800

FERROELECTRIC STORAGE MEANS

Filed Jan. 23, 1962 2 Sheets-Sheet 2

INVENTORS
ENNIO FATUZZO &
HANS ROETSCHI
BY Samuel Cohen
Attorney

United States Patent Office 3,281,800
Patented Oct. 25, 1966

3,281,800
FERROELECTRIC STORAGE MEANS

Ennio Fatuzzo, Zurich, and Hans Roetschi, Horgen, Switzerland, assignors to Radio Corporation of America, a corporation of Delaware Filed Jan. 23, 1962, Ser. No. 168,157
4 Claims. (Cl. 340—173.2)

The present invention relates to new and improved ferroelectric storage elements.

When an electric field is applied to a ferroelectric material, the material exhibits a relationship between the polarization of its "bound charge" and the applied field in the general form of the hysteresis loop exhibited by ferromagnetic materials. "Bound charge" refers to the electric dipoles in the material. By utilizing the ferroelectric material as the dielectric of a capacitor, this hysteresis effect can be employed for the storage of binary information for the control and switching of electric signals, and for other purposes. Circuits employing such storage elements are discussed in Patent Nos. 2,695,397 and 2,695,398 to J. R. Anderson, and elsewhere in the literature.

It is desirable in circuits employing ferroelectric storage elements that the polarization of the elements not be changed appreciably until the applied field exceeds a given threshold value. It would appear from the 60 cycle hysteresis loop associated with a ferroelectric storage element that this threshold value corresponds to a point somewhat beyond the knee of the hysteresis loop, similarly to the threshold magnetic field in the case of ferromagnetic materials. In practice, this has not been found to be the case. Ferroelectric materials do not exhibit a threshold electric field. They can be switched from one state of polarization at saturation to the other state of polarization at saturation by applying a very small electric field (much lower than that corresponding to the knee of the hysteresis loop), provided the field is applied for a sufficiently long time.

The deficiency above is a serious deterrent to the use of ferroelectric materials in storage applications such as memories. In coincident current memories, for example, a storage element should be switched from one state to the other in response to two coincident pulses but should not be switched in response to only one of the two pulses. If the element does not have a true threshold value, then that element may be switched over a period of time by the application of successive single pulses (sometimes known as "half-disturb" pulses). This eventually destroys the information stored in the element.

In recent years a number of investigators have attempted to solve the problem above by searching for new ferroelectric compounds. These investigators have hoped to develop compounds which exhibit a true threshold field (known in the art as a "true coercive field"). Although one investigator has claimed to have produced such a compound, this claim has been seriously disputed by others in the field.

The present invention relates to a new solution to the problem above. Rather than employing a new ferroelectric material as the dielectric of the storage element, the geometry of the storage element has been changed. It has been found that when the electrodes of the ferroelectric storage element are arranged in non-overlapping relationship, the ferroelectric storage element exhibits a true coercive field.

The invention is discussed in greater detail below and is shown in the following drawings of which:

FIG. 1 is a somewhat idealized hysteresis loop for ferroelectric materials;

FIGS. 2*a*–2*c* are drawings of prior art ferroelectric storage elements;

FIGS. 3*a*–3*d* are drawings of a ferroelectric storage element according to the present invention;

FIGS. 4*a* and 4*b* are graphs to help explain the operation of FIGS. 2 and 3;

Figures 1, 2A, 2B, 2C, 3A, 3B, 3C:
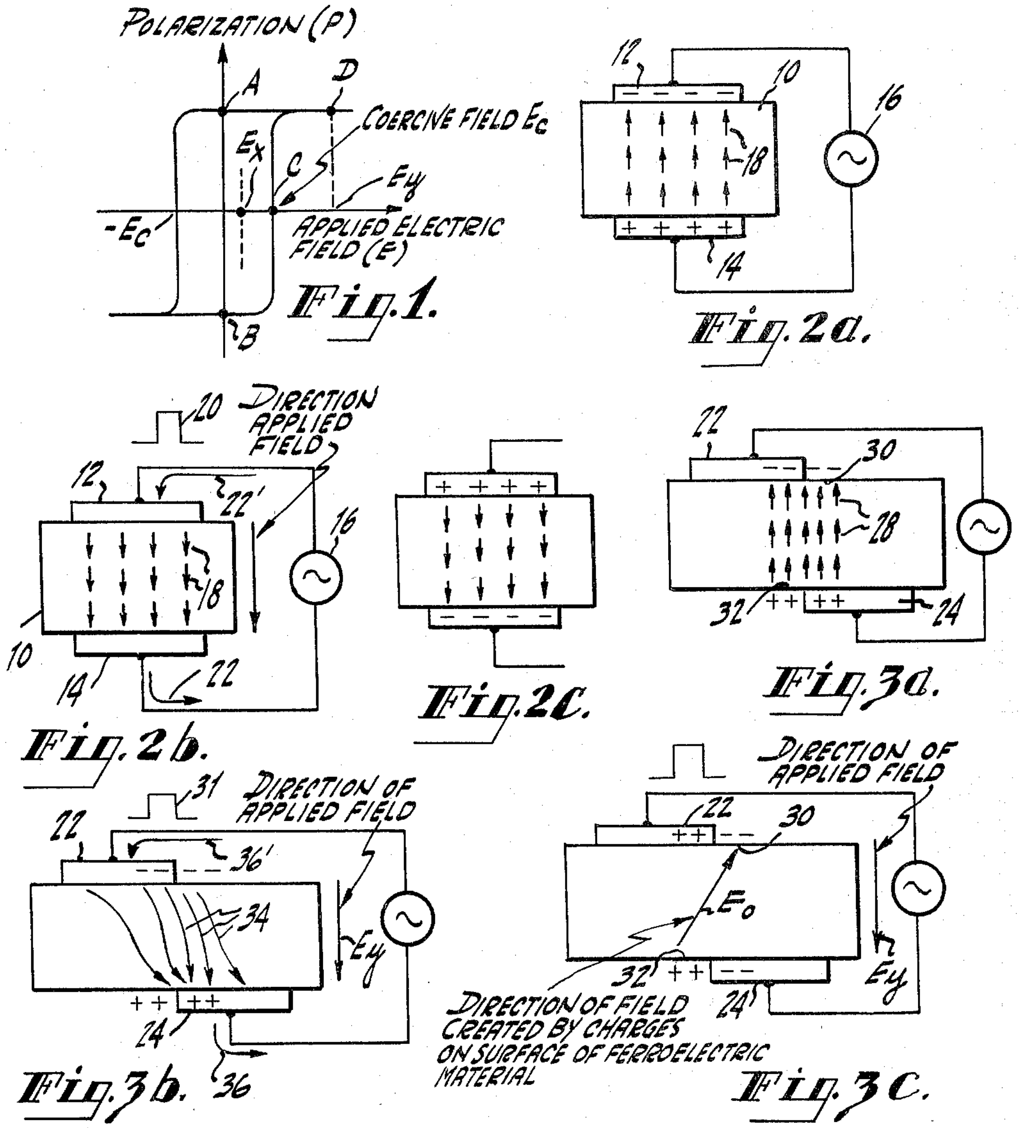

In the discussion which follows of the hysteresis loop of FIG. 1, the prior art ferroelectric storage element shown in FIGS. 2*a* to 2*c* is considered first. The two axes of the hysteresis loop are E, the applied electric field and P, the polarization of the ferroelectric body. At point A in the hysteresis loop, the polarization of the ferroelectric material is saturated in one direction and at operating point B in the hysteresis loop, the polarization of the material is saturated in the opposite direction. If the operating point is initially at B and an electric field $E_y$ of a value greater than the coercive field $E_c$ is applied to the element, the operating point of the element switches from B along flank C of the curve to point D of the curve. If the applied electric field is subsequently removed, the operating point changes from point D back to point A. The direction of polarization of the ferroelectric material remains in the state represented by A in the absence of further applied electric field.

Assume now that the initial operating condition of the ferroelectric material is B again. Assume also that an electric field $E_x$ is applied which is lower than the value $E_c$. It would appear from the curve that this value of electric field is insufficient to cause any switching of the ferroelectric material. However, it is found that if the electric field $E_x$ is maintained for a sufficient length of time, the polarization of the material is switched from the condition of saturation represented by B to the condition of saturation represented by A. The same thing occurs if a number of short pulses which produce fields of amplitude $E_x$ are successively applied to the material, even though any one of the pulses may be insufficient, by itself, to change the polarization of the material from one state of saturation to the other.

The operation just described in FIG. 1 is shown also in FIGS. 2*a*–2*c*. The storage element illustrated is conventional and consists of a body of ferroelectric material 10 and electrodes 12 and 14 on opposite surfaces of the ferroelectric material. The electrodes fully overlap. This is done intentionally as the fully overlapped electrodes provide the maximum capacitance at the storage element and the maximum amount of bound charge switched. A pulse source 16 is shown connected across the electrodes 12 and 14.

It may be assumed that the polarization of the ferroelectric material is initially in one direction as indicated by the small arrows 18. The head of the arrow representing a dipole indicates a positive charge and the tail of the arrow indicates a negative charge. With the dipoles oriented as indicated, the free charges in the electrodes are of the polarity indicated, that is, negative free charges at electrode 12 and positive free charges at electrode 14.

If now a positive voltage pulse 20 is applied to electrode 12, as shown in FIG. 2*b*, an electric field is created through the ferroelectric body 10 in the direction indicated by the arrow $E_y$. In representing an electric field, the convention is adopted that the head arrow points to the more negative voltage. The electric field tends to change the polarization of the bound charge to a direction 180° from the direction shown in FIG. 2*a*. This is shown by arrows 18' in FIG. 2*b*. The change in direction of bound charge causes the free charge at the electrodes to flow in the circuit in the direction indicated by arrows 22 and 22'. If the electric field $E_y$ is of sufficient amplitude or is applied for a sufficiently long time, or often enough, the ferroelectric material becomes saturated in a direction opposite from that shown in FIG. 2*a*. Under these conditions, the final charge configuration is as shown in FIG. 2*c*.

The explanation of FIG. 2 is merely to show, in a qualitative way, that an electric field can switch the polarization in a ferroelectric material and that in the process, no counteracting electric field appears to be created. The ferroelectric storage element of FIG. 2 does not possess a true coercive field.

Figure 3D:
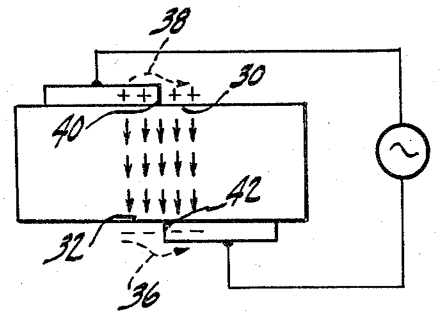

A ferroelectric storage element according to the present invention is shown in FIG. 3. The electrodes 22 and 24 do not overlap one another. The switching of the polarization in the element is believed to be due to the fringing electric field created between the two electrodes. The fringing field is defined as that portion of the field which extends beyond the edge of an electrode.

In the operation of the system of FIG. 3, it may be assumed that initially the polarization is in the direction indicated by the small arrows 28 in FIG. 3*a*. The free charge is now partially at the electrodes and partially on the surface of the dielectric material itself. A negative charge is deposited as, for example, from the atmosphere, onto the surface portion 30 of the ferroelectric material and a positive charge is deposited onto the surface portion 32 of the ferroelectric material. These charges neutralize the bound charges in the ferroelectric material which are adjacent to these surfaces.

Assume now that a positive pulse 31 (FIG. 3*b*) is applied to the electrode 22. This positive pulse causes an electric field $E_y$ to be applied between the electrodes and through the ferroelectric material. The field has a principal component in the direction of arrow $E_y$. The actual electric field lines are shown in somewhat schematic form at 34. The effect of the electric field is to tend to cause the electric dipoles 28 of FIG. 1 to turn over, that is, to reverse their direction by 180°. This, in turn, tends to make the free charges at the electrodes 22 and 24 flow in the direction of arrows 36 and 36'. This current flow tends to change the sign of the charges at the electrodes so that electrode 24 tends to become negative and electrode 22 tends to become positive as shown in FIG. 3*c*. The positive and negative charges at 22 and 24 are essentially neutralized by the bound charges in the ferroelectric material adjacent to these free charges. However, the negative and positive charges at the surface portions 30 and 32 cannot easily leak off because the ferroelectric material is an insulator. Accordingly, it is believed that an electric field $E_0$ develops in the ferroelectric material between these areas 30 and 32 in the direction indicated by arrow $E_0$. It may be observed that the field $E_0$ has a major component opposite to the direction of the applied field $E_y$. Accordingly, the field $E_0$ created by the surface charges at 30 and 32 tends to oppose the tendency of the electric dipoles in the ferroelectric material to change their orientation, that is, it tends to oppose the applied electric field $E_y$.

Regardless of whether or not the theory above is correct, it is found that a capacitor like the one shown in FIG. 3 does have a true coercive field. The 60 cycle hysteresis loop of this type of crystal is similar to the loop shown in FIG. 1. However, it is found that if an electric field having a magnitude lower than a certain value $E_c$ is applied to the ferroelectric body, the polarization of the ferroelectric material does not reverse, regardless of how long the electric field is applied. On the other hand, if the applied electric field exceeds $E_c$, the polarization switches rapidly from one direction to the opposite direction. The precise value of $E_c$ depends upon the ferroelectric material employed, the surface-breakdown of the ferroelectric, the thickness of the sample, the geometry of the capacitor, and so on.

It is believed that when the dielectric material is switched by the application of a field higher than $E_c$, the charges at 30 and 32 change their sign through a kind of nondestructive surface-breakdown process. The direction of current flow is as indicated by the dashed arrows 36 and 38 in FIG. 3*d*.

Figure 4A:
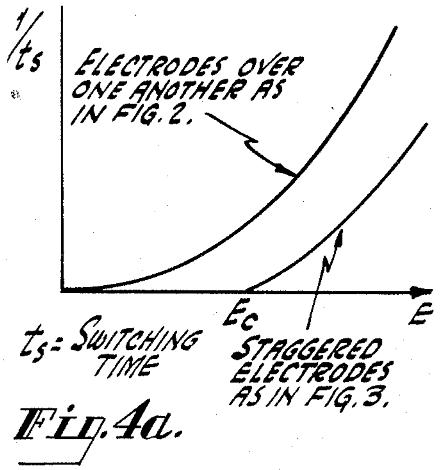
Figure 4B:
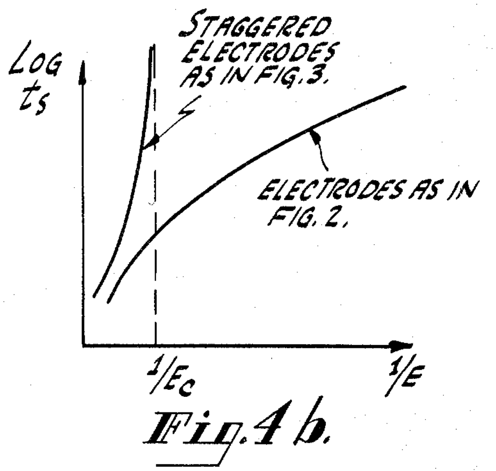

FIGS. 4*a* and 4*b* are graphs illustrating the behavior both of the prior art ferroelectric element of FIG. 2 and the storage element of the present invention, that is, the one of FIG. 3. $T_s$ is the time required for the ferroelectric material to switch from one state of polarization to the other. E is the applied electric field. FIG. 4*a* shows that for values of electric field lower than the true coercive field $E_c$, the prior art ferroelectric storage element does switch, provided $1/T_s$ is sufficiently low, that is, provided that $T_s$ is sufficiently long. On the other hand, the ferroelectric storage element of the present invention does not switch at all when E, the applied field, is lower than $E_c$. The same thing is shown in FIG. 4*b*. As $1/E$ approaches $1/E_c$, the switching time $T_s$ approaches infinity in the ferroelectric storage element of the invention. In other words, for values of the electric field lower than the critical value of electric field, the time required for the ferroelectric material to switch from one state to the other is infinite. On the other hand, in the prior art arrangement, even at very low values of electric field ($1/E$ large), the ferroelectric material does switch if the electric field is applied for a sufficiently long time.

The invention is applicable to many different ferroelectric materials. Also, electrode configurations somewhat different than those shown may be employed. However, the electrode configuration should be such that unneutralized charges on opposite surfaces of the ferroelectric material set up an electric field within the ferroelectric material which opposes the applied electric field. Also, the ferroelectric material should be such that only two directions of polarization are possible.

In a specific storage element configuration found to give good performance, the following materials were employed:

Ferroelectric material—a single crystal of triglycine sulfate of rectangular shape (1 cm.×0.7 cm.) having a thickness of 0.15 millimeter. Crystals may easily be made by slicing a large grown crystal along its cleavage planes to form numbers of thin crystals.

Electrodes—made of gold, of rectangular shape, about 1 cm.×0.35 cm., and from 1 to 10 microns thick. Materials such as silver or other metals which do not corrode easily are also suitable for use as electrodes. The electrodes may be vacuum evaporated onto the crystal through suitable masks.

Figure 5:
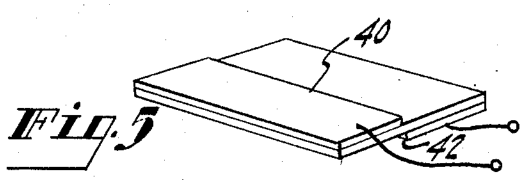
FIG. 5 is a perspective view of an embodiment of the invention employing rectangular electrodes.

The electrodes above are placed on opposite surfaces on the crystal in non-overlapping relation. One edge of one electrode is parallel to and substantially beneath the closest edge of the other electrode. Those edges correspond, for example, to edges 40 and 42 in FIGS. 3*d* and 5.

In the specific example discussed above, it was found that a voltage of about 120 volts was required to switch the ferroelectric material from one state to the other. This voltage corresponds to an electric field of about 8 kv./cm. and is substantially less than the breakdown field (100–150 kv./cm.) for a crystal of triglycine sulfate.

In the embodiment of the invention discussed above, it was stated that the two edges of the electrodes lie under one another. The invention also operates with the electrodes not overlapping and with the adjacent edges of the electrodes not directly under one another but spaced laterally apart a small distance such as a fraction of a centimeter. An embodiment of the invention of this type requires a somewhat greater electric field to switch the ferroelectric material from one state to another.

The embodiment of the invention given above by way of example employs a ferroelectric body of rectangular shape and electrodes of rectangular shape. A perspective view of such an arrangement appears in FIG. 5. Other electrode and body configurations are possible. For example, the embodiment of the invention shown in FIG. 6 has a ferroelectric body 50 of circular shape. The shape of the body is not critical and could even be irregular. However, it is preferable that the opposite surfaces which carry the electrodes be parallel. The upper electrode 52 is also circular; however, the lower electrode 54 is of annular shape. The inner edge 56 of the annular electrode is spaced slightly outwardly from the outer edge 58 of the circular electrode. Alternatively, the edge 56 may be directly beneath the edge 58.

Figure 6:
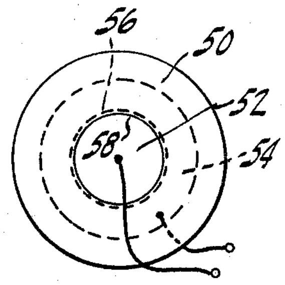
FIG. 6 is a plan view of an embodiment of the invention employing circular and annular electrodes, respectively.
Figure 7:
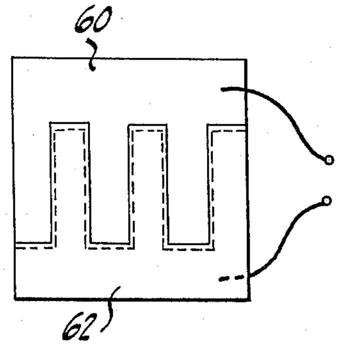
FIG. 7 is a plan view of an embodiment of the invention employing interleaved electrodes.

The embodiment of the invention shown in FIG. 7 is formed with upper and lower electrodes 60 and 62, respectively, which have interleaving portions. An advantage of the arrangement of FIG. 6 is that when the ferroelectric material is switched from one state to the other, more charge is switched and a larger output signal is obtained.

In all embodiments of the invention it is preferable that the edges of the two electrodes most closely adjacent to one another be parallel to one another. This improves the squareness of the hysteresis loop.

A plurality of ferroelectric elements according to the invention may be arranged in arrays for storage of information (memories) or for switching of signals (pyramid or other types of switching matrices). A single crystal with a large number of electrodes on opposite surfaces thereof, or a plurality of individual crystals, each with a pair of electrodes, as in FIGS. 3, 5, 6 or 7 may be employed.

In the embodiment of the invention discussed above, a crystal of triglycine sulfate is employed. There are many other ferroelectric materials which are suitable. The list below, which is not meant to be exhaustive, gives some of the more common monocrystalline materials which are suitable.

Guanidine aluminum sulfate hexahydrate
Guanidine vanadium sulfate hexahydrate
Guanidine chromium sulfate hexahydrate
Guanidine aluminum selenate hexahydrate
Triglycine fluoberyllate
Lithium selenite
Tetramethylammonium trichloro mercurate
Rochelle salt
Heavy rochelle salt
Diglycine manganous chloride dihydrate

What is claimed is:

1. A ferroelectric storage element comprising a body of ferroelectric material and a pair of electrodes on opposite surfaces of the material arranged in non-overlapping relationship, said electrodes including interleaving portions.

2. A ferroelectric element comprising a body of ferroelectric material whose dipoles assume one of two possible orientations both parallel to a given line, a pair of electrodes on opposite surfaces of the material arranged to establish an electric field between said electrodes solely at a non-zero angle with respect to said line and means for applying a difference of potential across said electrodes.

3. In combination, a body of ferroelectric material which is capable of assuming one of only two states of polarization; and means for switching the body from one state of polarization to the other comprising electrodes arranged in non-overlapping relationship located on opposite surfaces of the body and means for applying a difference of voltage between said electrodes to thereby create a fringing electric field through the body.

4. A method of operating a ferroelectric storage element comprising the step, during the application of a switching field to the body for switching its polarization state, of establishing a field through the body which tends to oppose the switching field, whereby the switching field must exceed a given value before the change in polarization state can occur.

References Cited by the Examiner

UNITED STATES PATENTS

| | | | |
|---|---|---|---|
| Re. 23,813 | 4/1954 | Adler | 340—173.2 |
| 3,007,139 | 10/1961 | Young | 340—173.2 |
| 3,032,706 | 5/1962 | Wieder | 340—173.2 |
| 3,042,904 | 7/1962 | Brennemann | 340—173.2 |
| 3,104,377 | 9/1963 | Alexander | 340—173.2 |

References Cited by the Applicant

FOREIGN PATENTS 514,658 7/1955 Canada.

BERNARD KONICK, *Primary Examiner.*

IRVING SRAGOW, *Examiner.*

T. W. FEARS, *Assistant Examiner.*